(12) United States Patent  (10) Patent No.: US 9,240,940 B2
Baron  (45) Date of Patent: Jan. 19, 2016

(54) SCALABLE INFINIBAND INTERCONNECT PERFORMANCE AND DIAGNOSTIC TOOL

(71) Applicant: John Baron, Burnsville, MN (US)

(72) Inventor: John Baron, Burnsville, MN (US)

(73) Assignee: Silicon Graphics International Corp., Milpitas, CA (US)

( * ) Notice: Subject to any disclaimer, the term of this patent is extended or adjusted under 35 U.S.C. 154(b) by 197 days.

(21) Appl. No.: 13/843,919

(22) Filed: Mar. 15, 2013

(65) Prior Publication Data

US 2014/0269342 A1    Sep. 18, 2014

(51) Int. Cl.
*H04L 12/26*    (2006.01)
*H04L 12/24*    (2006.01)

(52) U.S. Cl.
CPC ............ *H04L 43/50* (2013.01); *H04L 41/0645* (2013.01); *H04L 41/0677* (2013.01); *H04L 41/12* (2013.01)

(58) Field of Classification Search
CPC ..... H04L 12/2697; H04L 43/50; H04L 12/26; H04L 12/2602; H04L 41/5009; H04L 41/5022; H04L 43/00; H04L 43/16; H04L 45/28
USPC ................................ 370/241, 254, 401; 714/2
See application file for complete search history.

(56) References Cited

U.S. PATENT DOCUMENTS

| 4,814,980 A * | 3/1989 | Peterson et al. .............. 709/216 |
| 2003/0023716 A1* | 1/2003 | Loyd .............................. 709/224 |
| 2008/0168011 A1* | 7/2008 | Steinberg ........................ 706/12 |
| 2011/0228789 A1* | 9/2011 | Jia ................................. 370/401 |
| 2011/0228799 A1* | 9/2011 | Chun et al. .................... 370/476 |

* cited by examiner

*Primary Examiner* — Andrew Chriss
*Assistant Examiner* — Romani Ohri
(74) *Attorney, Agent, or Firm* — Lewis Roca Rothgerber LLP (57) ABSTRACT

In accordance with some implementations, a method for evaluating large scale computer systems based on performance is disclosed. A large scale, distributed memory computer system receives topology data, wherein the topology data describes the connections between the plurality of switches and lists the nodes associated with each switch. Based on the received topology data, the system performs a data transfer test for each of the pair of switches. The test includes transferring data between a plurality of nodes and determining a respective overall test result value reflecting overall performance of a respective pair of switches for a plurality of component tests. The system determines that the pair of switches meets minimum performance standards by comparing the overall test result value against an acceptable test value. If the overall test result value does not meet the minimum performance standards, the system reports the respective pair of switches as underperforming.

13 Claims, 8 Drawing Sheets

FIGURE 5C — Two Dimensions

FIGURE 5B — One Dimension

FIGURE 5D — Three Dimensions

FIGURE 5A — Single Switch (Zero Dimensions)

SCALABLE INFINIBAND INTERCONNECT PERFORMANCE AND DIAGNOSTIC TOOL

TECHNICAL FIELD

The disclosed implementations relate to the field of large multi-processor computer systems generally and in particular to evaluating the performance of large scale computer systems.

BACKGROUND

Computer systems have consistently grown in scale and performance capability. However, as the problems to be solved by computer systems have grown more complex and the amount of data that needs to be processed grows, traditional, single CPU computer systems ceased to be sufficient. To solve the more complex problems and deal with large amounts of data, computer systems with large number of processors working in parallel were developed.

Massively parallel computer systems can be built with a variety of topologies. Some large computing networks are organized in broadcast networks topologies, with a hierarchical switch network topology. Other large computer networks employ a switched fabric topology where network nodes connect with each other through one or more network switches. Switched fabric technologies can offer better throughput because communication traffic is spread across a larger number of physical links. However, failure of components within the switched fabric technology can substantially degrade performance of the entire large computer network.

Because a small number of failures can significantly degrade the performance of an entire switched fabric network, detecting and locating failures within the switched fabric network is increasingly important for manufacturers of large, parallel processing computer systems. Traditionally, failures were detected by running diagnostic tools on each individual switch or node to detect port errors.

SUMMARY

In accordance with some implementations, a method for evaluating large scale computer systems based on performance is disclosed. The method is performed at a large scale, distributed memory computer system having a plurality of switches, wherein each switch is connected to a plurality of nodes, and wherein each node includes one or more processors and memory storing one or more programs for execution by the one or more processors. The large scale, distributed memory computer system receives topology data, wherein the topology data describes the connections between the plurality of switches and lists the nodes associated with each switch. Based on the received topology data, for a plurality of pairs of switches in the plurality of switches, wherein each of the pairs of switches includes a first switch and a second switch that connect to each other via direct links, the system performs a data transfer test for each of the pair of switches, wherein the data transfer test determines overall data transfer performance of a respective pair of switches. The test includes transferring data between a plurality of nodes associated with a first switch in a pair of switches and a plurality of nodes associated with a second switch in a pair of switches and determining a respective overall test result value reflecting overall performance of a respective pair of switches for a plurality of component tests, wherein the component tests reflect performance of links between switches and/or performance nodes connected to the switches during the transfer of data. The system determines that the pair of switches meets minimum performance standards by comparing the overall test result value against an acceptable test value. In accordance with a determination that the overall test result value does not meet the minimum performance standards, the system reports the respective pair of switches as underperforming.

In accordance with some implementations, a computer system evaluating large scale computer systems based on performance is disclosed. The computer system has one or more processors and memory storing one or more programs to be executed by the one or more processors. The one or more programs include instructions for receiving a volume change command from a computer system. The one or more programs further include instructions for receiving topology data, wherein the topology data describes the connections between the plurality of switches and lists the nodes associated with each switch. The one or more programs further include instructions for, based on the received topology data, for a plurality of pairs of switches in the plurality of switches, wherein each of the pairs of switches includes a first switch and a second switch that connect to each other via direct links, performing a data transfer test for each of the pair of switches, wherein the data transfer test determines overall data transfer performance of a respective pair of switches. The one or more programs further include instructions for transferring data between a plurality of nodes associated with a first switch in a pair of switches and a plurality of nodes associated with a second switch in a pair of switches. The one or more programs further include instructions for determining a respective overall test result value reflecting overall performance of a respective pair of switches for a plurality of component tests, wherein the component tests reflect performance of links between switches and/or performance nodes connected to the switches during the transfer of data. The one or more programs further include instructions for determining that the pair of switches meets minimum performance standards by comparing the overall test result value against an acceptable test value. The one or more programs further include instructions for in accordance with a determination that the overall test result value does not meet the minimum performance standards, reporting the respective pair of switches as underperforming.

In accordance with some implementations, a non-transitory computer readable storage medium storing one or more programs configured for execution by a computer system is disclosed. The one or more programs also include instructions for receiving a volume change command from a computer system. The one or more programs further include instructions for receiving topology data, wherein the topology data describes the connections between the plurality of switches and lists the nodes associated with each switch. The one or more programs further include instructions for, based on the received topology data, for a plurality of pairs of switches in the plurality of switches, wherein each of the pairs of switches includes a first switch and a second switch that connect to each other via direct links, performing a data transfer test for each of the pair of switches, wherein the data transfer test determines overall data transfer performance of a respective pair of switches. The one or more programs further include instructions for transferring data between a plurality of nodes associated with a first switch in a pair of switches and a plurality of nodes associated with a second switch in a pair of switches. The one or more programs further include instructions for determining a respective overall test result value reflecting overall performance of a respective pair of switches for a plurality of component tests, wherein the component tests reflect performance of links between switches and/or performance nodes connected to the switches during the transfer of data. The one or more programs further include instructions for determining that the pair of switches meets minimum performance standards by comparing the overall test result value against an acceptable test value. The one or more programs further include instructions for in accordance with a determination that the overall test result value does not meet the minimum performance standards, reporting the respective pair of switches as underperforming.

BRIEF DESCRIPTION OF THE DRAWINGS

Like reference numerals refer to corresponding parts throughout the drawings.

DESCRIPTION OF IMPLEMENTATIONS

In some implementations, a large, multiprocessor switched fabric computer system with distributed memory includes a plurality of switches. In some implementations, each switch includes a plurality of ports. The ports allow each switch to link directly to one or more other switches and a plurality of nodes. Each node is a computer system with a processor and memory and is directly linked to a single switch. In some implementations, the switched fabric network includes a control node that receives instructions from a user or other outside entity and coordinates completion of the assigned tasks with the plurality of switches and nodes. However, if any of the components fail or perform at a substandard level, the performance of the entire system can be affected. Thus, quick and accurate testing is essential to providing the best performing statically routed networks.

It should be noted that all though many of the examples of large, multiprocessor switched fabric computer systems used in the following description use a hypercube topology, the same methods and processes can be used on any topology known by those skilled in the art, including but not limited to all-to-all topologies, fat-tree topologies, torus topologies, and mesh topologies.

In some implementations, the components of a large, multiprocessor switched fabric computer system are performance tested to determine whether any of the components have failed or are performing at substandard levels. To perform the performance test, the control node matches each switch in the plurality of switches with another switch that directly links to it. The switches are paired or grouped based on topology data that describes the direct connections between various switches and a listing of nodes linked to each switch in the plurality of switches. Based on the stored topology data, all the switches are grouped into testing pairs, wherein each testing pair is directly connected by a link and no switch is in more than one testing pair at a time.

In some implementations, the control node coordinates performance of data transfer test for each switch by instructing a first set of nodes associated with the first switch to transmit data to a second set of nodes associated with the second switch. Based on the data transfer test, the control node generates an overall test result value for each switch. In some implementations, the overall test result value represents the overall performance of the switch and includes a plurality of component test results. In some implementations, the overall test result value is compared against an acceptable test value. The control node will report or record any switch with an overall test result value that does not meet the acceptable test value as a point of failure or an underperforming component of the overall system.

In some implementations, when the overall test result value does not meet the acceptable test value, the control node then determines the specific components that have failed or are currently underperforming. This is accomplished by performing individual component performance tests. In some implementations, each node connected to the underperforming switch or pair of switches will have a respective data transfer test and a respective test result value. The respective test result values for each node are then compared, and nodes with scores below the minimum acceptable level can be identified. In some implementations, each switch has a plurality of ports. Each port is connected to a node or another switch.

In some implementations, the control node tests each link between switches individually by instructing the nodes to transfer data over only one of the links at a time. In some implementations, two switches may be connected by more than one direct link to increase bandwidth. A score is then generated for each link and underperforming links can be identified.

Figure 1:
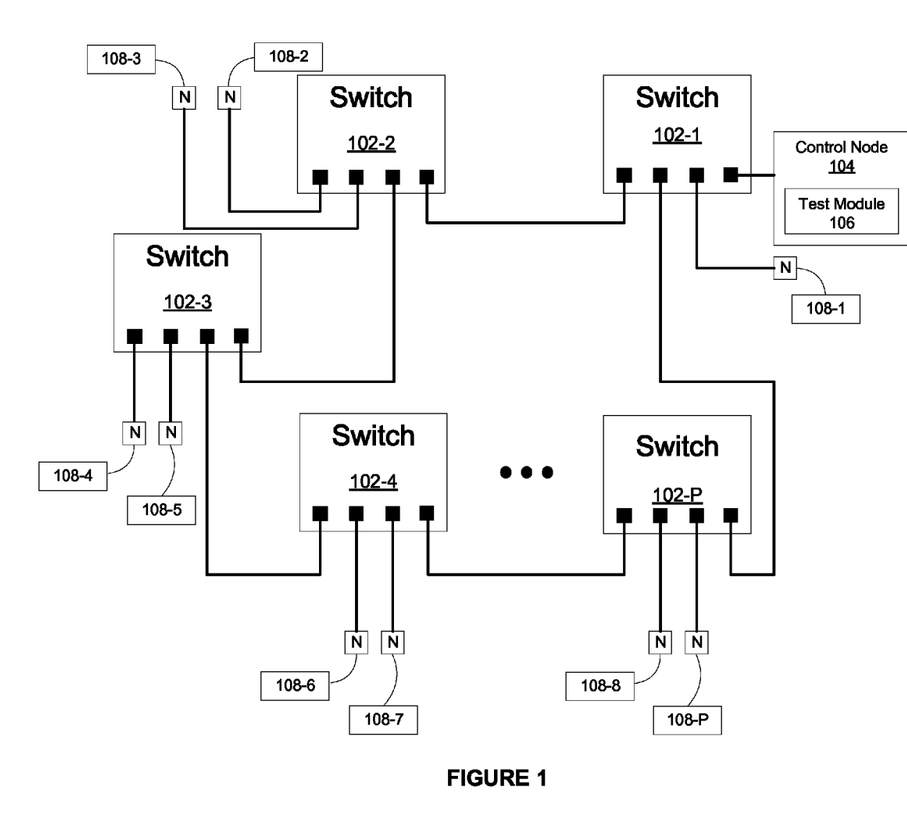
FIG. 1 is a block diagram illustrating a switch fabric integrated computing environment in accordance with some implementations.

In some implementations, each switch is connected to at least one other switch in the large, multiprocessor switched fabric computer system. In some implementations, each switch is connected to N other switches in the large, multiprocessor switched fabric computer system. In some implementations, a large, multiprocessor switched fabric computer system has switches that are arranged in a hypercube topology with N dimensions, when each switch connects to N other switches. In some implementations, when an N-dimension large, multiprocessor switched fabric computer system is tested, each dimension is tested separately. In some implementations, the large, multiprocessor switched fabric computer system is arranged into another topology such as all-to-all, 2-level fat tree, or any other topology known in the art FIG. 1 is a block diagram illustrating a switch fabric integrated computing environment in accordance with some implementations. In some implementations, the multi-processor integrated computing environment includes a plurality of switches (102-1 to 102-P), a plurality of nodes (108-1 to 108-P), links between the nodes and the switches, and at least one control node 104. In some implementations, the plurality of switches 102 are each directly linked to one or more other switches 102 in the plurality of switches 102. In some implementations, the plurality of switches 102 is linked in a hypercube topology. In some implementations, the hypercube topology has an associated number of dimensions and the number of dimensions is based on the number of switches 102 that each switch directly links to. For example, a hypercube technology that connects each switch to two other switches can be a 2-dimensional hypercube.

In some implementations, each switch 102 is directly connected or linked to a plurality of nodes 108. The number of nodes 108 directly linked to each switch 102 is determined at least partially on the number of ports associated with each switch 102. For example, if a switch has 36 ports, 9 or 18 may be dedicated to connecting to nodes and the remaining ports are used to link to other switches 102 in the multi-switch integrated computing environment. In some implementations, two directly linked switches 102 are linked by only one port (i.e., only one physical link connecting a port on the first switch to a port on the second switch). In other implementations, two directly linked switches 102 are linked by more than one port (i.e., more than one physical link or wire connecting more than one port on the first switch to more than one port on the second switch.). In some implementations, hypercube topologies where switches are directly linked with only one link or cable connecting switches are called standard hypercubes and hypercube topologies where switches are directly linked with more than one link or cable are called "enhanced" hypercubes.

In some implementations, the links between switches are bi-directional, such that information can be sent from a first switch 102-1 to a second switch 102-2 and from the second switch 102-2 to the first switch 101-2. In some implementations, these links are designed to be high through-put, low latency, have high quality of service and failover, and to be scalable. For example, the links may be Infiniband connections.

In some implementations, the multi-switch integrated computing environment is non-centralized. In this case, nodes can communicate with each other directly and data and instructions are passed from node to node through switches 102 without having to pass back to a centralized control point. In some implementations, the message routing in the non-centralized multi-switch integrated computing environment is static. Static routing results in data and/or instructions always taking the same fixed path between two nodes in the multi-switch integrated computing environment. In other implementations, routing is dynamic, such that the system determines in real-time the best pathway for a particular piece of data or command to travel between two switches or nodes.

In some implementations, each node 108 in the multi-switch integrated computing environment connects directly to a switch 102. Each node includes a processor and a computer readable storage medium. For example, each node may be a blade server that includes a processor, RAM, and a hard drive or other data storage system. In some implementations, nodes are given tasks to perform or data to store by a control node 104. Each node 108 then performs its allocated task and sends and/or receives data to or from other nodes 108.

In some implementations, the multi-switch integrated computing environment includes a control node 104. The control node 104 administrates the system and allows a user or other external entity to give the multi-switch integrated computing environment tasks and to store or received data from the multi-switch integrated computing environment. In some implementations, the control node includes a test module 106 in memory. In some implementations, the test module 106 is configured to help perform a test of the various components (switches 102, nodes 108, and links) of the multi-switch integrated computing environment.

In some implementations, the test module 106 includes or receives topological data that describes the layout of the multi-switch integrated computing environment. The topological data includes a list of all the components in the multi-switch integrated computing environment including all the nodes 108 and the switches 102. In some implementations, the topological data further includes information describing the connections between each of the components. For example, for each node, the topological data includes information identifying the switch to which the node directly connects. For each respective switch, the topological data lists all the nodes 108 that connect to it and all the switches 102 that directly link to the respective switch.

In some implementations, the topological data describes an N-dimensional hypercube wherein each switch connects to N other switches 102. In some implementations, the test module 106 uses the topological data to group all of the switches into groups of two. Each group of two includes two switches 102 that directly link to each other and are not included in any other group of two in a given hypercube dimension.

In some implementations, the test module 106 creates a plurality of MPI host files, wherein MPI is the internode communication paradigm. Each host file represents a pair of directly connected switches and lists all the nodes associated with each switch pair. For a given hypercube system, there are $D*2^{(D-1)}$ host files created, wherein D is the number of dimensions in the hypercube.

In some implementations, the test module 106 then runs data transfer tests on each group of two switches 102. In some implementations, all data tests for each group of two switches in a given hypercube dimension are conducted simultaneously. This has the advantage of speeding up the testing process and is possible because each switch is only included in a single group of two switches 102 and thus will not need to transmit data to any other switch 102 during the data transfer test. In some implementations, the data transfer test includes transferring a predetermined amount of data from each node 108 connected to a first switch 102-1 to each node 108 connected to a second switch 102-2. In some implementations, the data transfer test is arranged to ensure that each direct line between the first switch 102-1 and the second switch 102-2 is used during the data transfer test.

In some implementations, the test module 106 determines an overall test result value for each pair of switches 102 as a result of the data transfer test. In some implementations, the overall test result value represents an average or composite time necessary time to transfer the predetermined amount of data from the first switch 102-1 to the second switch 102-2. This value takes into account the time associated with transferring the data from each node 108 associated with the first switch 102-1 to nodes 108 associated with the second switch 102-2. In some implementations, the data transfer tests are bi-directional. Thus, the overall test result value represents the aggregate value for transferring the predetermined amount of data both from all the nodes 108 associated with the first switch 102-1 to nodes associated with the second switch 102-2 and from all nodes 108 associated with the second switch 102-2 to nodes 108 associated with the first switch 102-1. In some implementations, the overall test result value is determined by measuring the transfer rate associated with moving a region of memory from one node to another node.

In some implementations, the overall test result value is compared against a minimum performance value. In some implementations, the minimum performance test is a predetermined value. The predetermined value is fixed for all pairs of switches in a given hypercube dimension. In some implementations, the predetermined value is dynamically determined based on the specifications of the switches, the nodes and the links between them.

In some implementations, the minimum performance value is based on the average or median over all test result values for every pair of switches in the multi-switch integrated computing environment. Thus, the testing module 106 first calculates the overall test result value and then determines either the average value or the median value. In some implementations, the predetermined value is then set to be 10 percent less than the median or average score, so that any overall test result value that falls within 10 percent of the overall test result value average or median is above the minimum predetermined value.

In some implementations, any pair of switches 102 that falls below the predetermined minimum value score is recorded as underperforming. Once a node has been recorded as underperforming, the testing module 106 performs a component by component data transfer test for each node 108, switch 102, and link in the pair of switches. The testing module 106 tests each link between the two switches 102 separately and then compares the test result values to determine if one of the links is underperforming. For example, the first switch and the second switch are connected though four physical links and the testing module 106 sends data from node A associated with the first switch to node B associated with the second switch over one of the four physical links at a time. The testing module 106 then compares the test result value for each link. If any of the links have a test value that is significantly below the median test value score (for example, more than 10 percent less), the testing module 106 determines that the link is the underperforming component.

In some implementations, each node associated with a first switch 102-1 communicates with a particular node associated with a second switch 102-2 over the same physical link each time because the routing is static. For example, whenever node 1 associated with the switch 1 communicates with node 3 associated with switch 2, it always uses the physical link 1 between the two switches. In a well balanced system node communication traffic is spread evenly between all the physical links. When performing a component test, the testing module 106 tests each node pair and then compares the results of all the individual node pairs. Analysis of all the individual node pair tests indicates whether the underperforming component is one of the nodes or one of the links.

In some implementations, the testing module 106 then tests each node. This test is performed by transferring data from each node associated with the first switch 102-1 to one or more nodes of the second switch 102-2 and then transferring data from each node 108 associated with the second switch 102-2 to one or more nodes of the first switch 102-1. The testing module 106 then uses test result values for each node 108 to determine if any of the nodes are underperforming.

In some implementations, the testing module 106 identifies faulty or underperforming components by rerunning the same data transfer tests that were run in the overall data transfer test and also recording the routing information for each data transfer as they happen. Using the additional routing information, the testing module 106 can identify specific data transfer routes that are underperforming and identify the specific underperforming component. For example, if all the data transfers that go through a specific link between the paired switches are below the minimum acceptable speed, the testing module identifies the specific link as a point of failure.

In some implementations, the testing module 106 records the results of the data transfer test including any identified underperforming switches 102 or components. These results can be provided for presentation to a user or stored in a file for later use.

Figure 2:
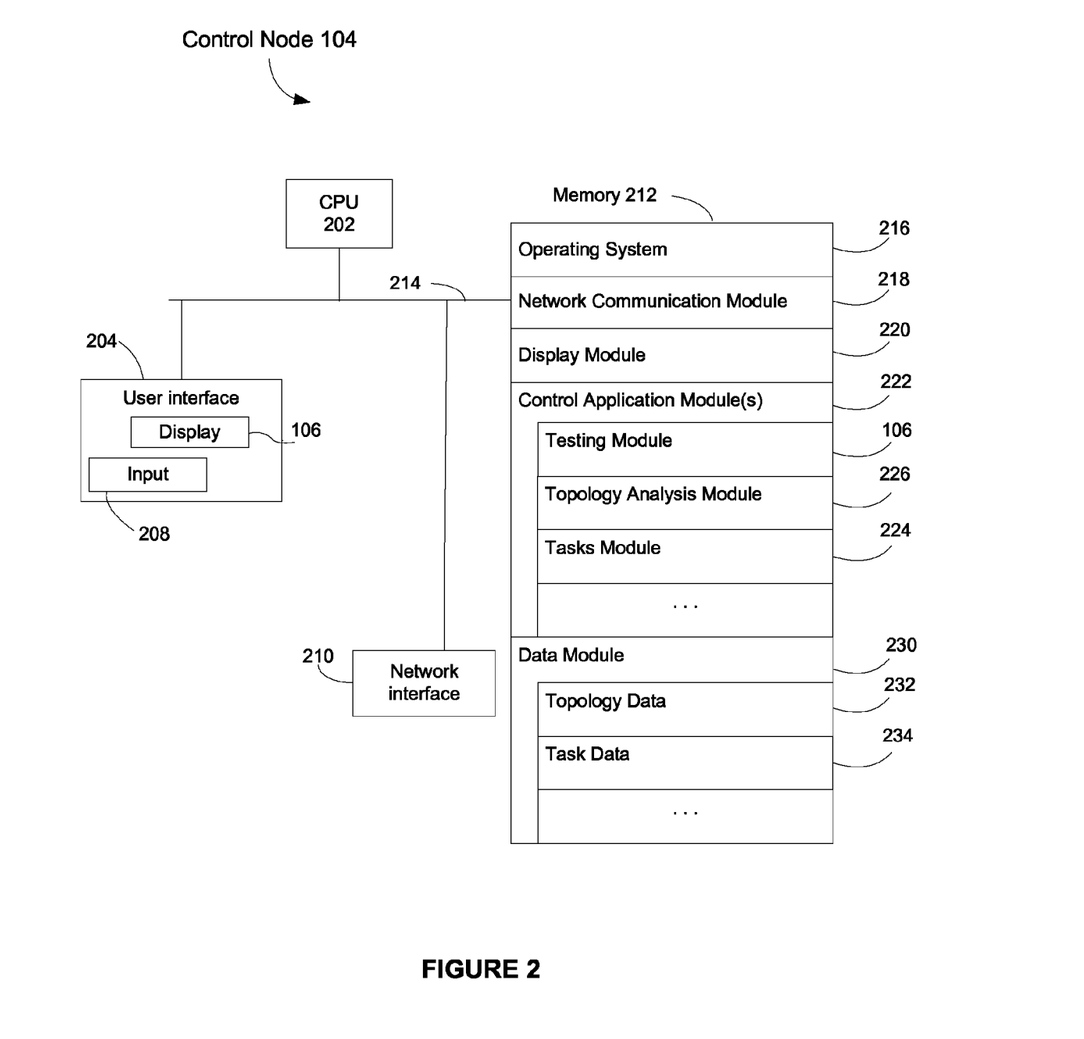
FIG. 2 is a block diagram illustrating a control node, in accordance with some implementations.

FIG. 2 is a block diagram illustrating a control node 104, in accordance with some implementations. The control node 104 typically includes one or more processing units (CPU's) 202, one or more network interfaces 210, memory 212, a display 106, and one or more communication buses 214 for interconnecting these components. The control node 104 includes a user interface 204. The user interface 204 includes an associated display device 106 and optionally includes an input means such as a keyboard, mouse, a touch sensitive display, a microphone, or other input buttons 208. Optionally, the display device 106 includes an audio device or other information delivery device. Furthermore, some control nodes use a microphone and voice recognition to supplement or replace the keyboard.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting the control node 104 to other computers via the one or more communication network interfaces 210 (wired or wireless) and one or more communication networks, such as the Internet, other wide area networks, local area networks, metropolitan area networks, and so on;
- a display module 220 for enabling display of information on a display 106 associated with the control node system 104;
- one or more control node 104 applications module(s) 222 for enabling the control node 104 to perform the functions offered by the control node 104, including but not limited to:
  - a testing module 106 for performing data transfer tests for switches and components within a multi-switch integrated computing environment to determine if any of the components are underperforming including performing a data transfer test for all the switches and nodes in the multi-switch integrated computing environment, rating the performance and recording underperforming components;
  - a topology analysis module 226 for determining the topology of a multi-switch integrated computing environment including a list of all the nodes 108 and switches 102 in the multi-switch integrated computing environment and all the direct links between switches 102 and nodes 108; and
  - a tasks module 224 for storing instructions for performing tasks assigned to the multi-switch integrated computing environment by a user or other outside entity; and
- a data module 230 for storing data related to the control node 104, including but not limited to:
  - topology data 232 including a list of all the nodes 108 and switches 102 in the multi-switch integrated computing environment and all the direct links between switches 102 and nodes 108; and task data 234 including data necessary to perform tasks assigned to the multi-switch integrated computing environment.

Figure 3:
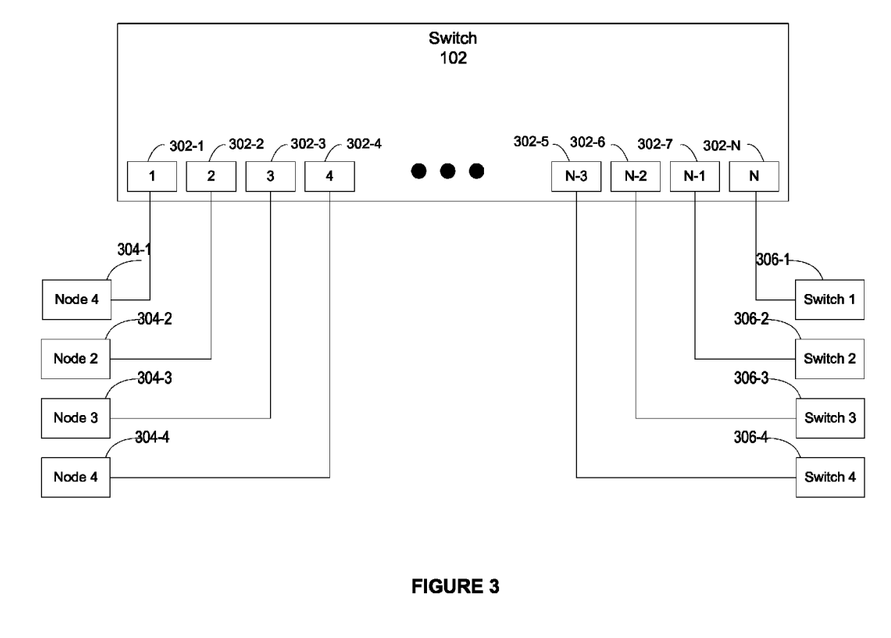
FIG. 3 is a block diagram of a switch in a multi-switch integrated computing environment in accordance with some implementations.

FIG. 3 is a block diagram of a switch in a multi-switch integrated computing environment in accordance with some implementations. In some implementations, one switch 102 in a multi-switch integrated computing environment includes a plurality of ports (302-1 to 302-N). In some implementations, the switch includes 36 ports. In other implementations, the switch 300 includes 384 ports or 648 ports.

In some implementations, the switch 102 connects to a plurality of nodes (304-1 to 304-4). Each node is connected to the switch 102 though a link. In some implementations, each node 304 includes a processor and memory. In some implementations, each node 304 performs operations and stores data in memory. In some implementations, data is transferred to and from each node 304 through the switch 102.

In some implementations, each switch 102 is connected to one or more other switches (306-1 to 306-4) through links for one or more ports 302. In some implementations, the switch 102 has one direct link to one other switch 306. In other implementations, the switch 102 has more than one direct link to one other switch 306. In some implementations, the switch 102 has one direct link to a plurality of other switches 306-1 to 306-4. In some implementations, the switch 102 has more than one direct link to a plurality of other switches a 306-1 to 306-4. The throughput of data through a switch 102 to another switch depends at least partially on how many direct links connect the two switches.

Figure 4:
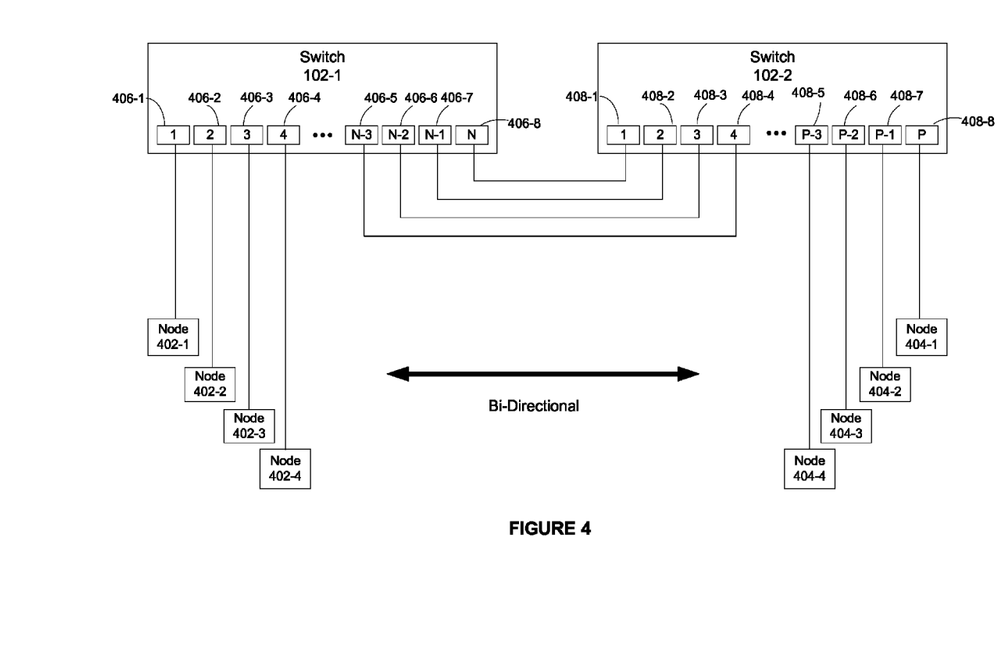
FIG. 4 is a block diagram of a pair of switches with direct links to each other in accordance with some implementations.

FIG. 4 is a block diagram of a pair of switches with direct links to each other in accordance with some implementations. In some implementations, a pair of switches includes a first switch 102-1 and a second switch 102-2. Each switch 102 has a plurality of ports (406-1 to 406-8 and 408-1 to 408-8). In some implementations, each switch 102 has a plurality of nodes (402-1 to 402-4 and 404-1 to 404-4) that are directly linked to the switch 102 through one of the ports 406.

In some implementations, each switch connects to at least one other switch 102-1 through one of the ports 406. Switches 102-1 in standard hypercube topologies have a single physical link to other switches 102-2. Switches 102-1 in enhanced hypercube topologies have more than one physical link to other switches 102-2.

In some implementations, when a performance test is conducted both nodes 402 associated with the first switch 102-1 receive instructions to transfer a predetermined amount of data to nodes 404 associated with the second switch 102-2 and to receive data from nodes 404 associated with the second switch 102-2 over the bi-directional link. A control node (FIG. 1, 106) measures the time it took to transfer the predetermined amount of data and uses that time measure meant to generate an overall test result value for the pair of switches. In some implementations, the overall test result value represents the aggregate or composite score for all the components in the pair of switches 102.

In some implementations, the overall test result value is compared against a predetermined minimum test result value. If the overall test value is higher than the predetermined test result value, the pair of switches is determined to be functioning at an acceptable level. If the overall test value is lower than the predetermined test result value, the pair of switches is determined to be underperforming or faulty.

In some implementations, when the pair of switches is determined to be underperforming, the pair of switches receives instructions to test each component individually. In some implementations, the links between the two switches are tested individually. Data is transferred from a node 402 associated with a first switch 102-1 to a node 404 associated with a second switch 102-2 over a single link (for example, the link between port 406-5 to port 408-4) at a time. In some implementations, the same data is transferred between the same first node and second node for all links (in this case, 406-5 to 408-4, 406-6 to 408-3, 406-7 to 408-2, and 406-8 to 408-1). The time to transfer is recorded.

In some implementations, the time taken to transfer the same amount of data over each link is recorded and compared. If one link falls significantly below the average it is determined to be underperforming. If all of the links perform at an acceptable level, it is determined that the links and the nodes are not the source of the underperformance of the pair of switches.

In some implementations, the switches receive instructions to test each node by transferring a predetermined amount of data from each node 402 associated with the first switch 102-1 to a second node 404 associated with the second switch 102-2. In some implementations, every node 402 associated with the first switch 102-1 transfers data to the same receiver node 404 associated with the second switch 102-2 to minimize the number of variables that might affect the performance measurement. In some implementations, each node 402 associated with the first switch 102-1 transfers the predetermined amount of data to different nodes 404 associated with the second switch 102-2 to complete the test as quickly as possible. Similarly, each node 404 associated with the second switch 102-2 also transfers the predetermined data to a node 402 associated with the first switch 102-1. The time needed to transfer the predetermined data is measured for each node associated with either the first switch 102-1 or the second 102-2.

In some implementations, the measured time for each node is compared and any nodes with times that fall below an acceptable level are determined to be underperforming or otherwise defective. In some implementations, none of the nodes or the switches is determined to be underperforming. In this case, the test module 106 performs tests that determine whether switches are underperforming due to issues with load balancing on the switch.

FIGS. 5A-5D are block diagrams of hypercube topologies in accordance with some implementations. Specifically, each Figure shows a hypercube with a different number of dimensions. Note that each circle (e.g. A, B, C, D, etc) represents a switch (FIG. 1, 102) and associated compute nodes The lines between circles represent direct links between switches (FIG. 1, 102). Each line may represent a single physical link (in a standard hypercube) or more than one physical link (in enhanced hypercubes).

Figure 5A:
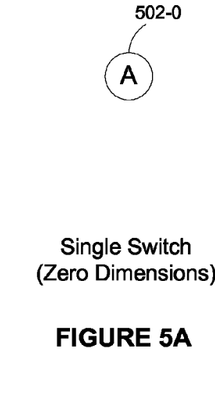
FIGS. 5A-5D are block diagrams of hypercube topologies in accordance with some implementations.
Figure 5B:
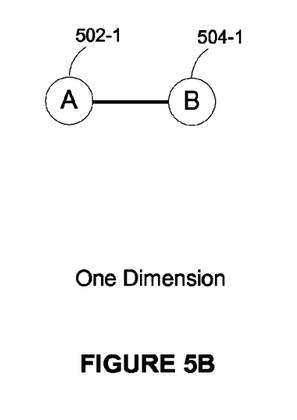

FIG. 5A represents a single switch 502-0 with no connections to other switches (FIG. 1, 120). With no connections, this is considered a zero dimensional hypercube or, alternatively, not a hypercube at all. FIG. 5B represents a first switch 502-1 and a second switch 504-1 with direct connection between them. Each switch is connected to one other switch and thus, FIG. 5B represents a one dimensional hypercube. In some implementations, a one dimensional hypercube is a ring or a line, where each switch is connected to a switch ahead and one switch behind.

Figure 5C:
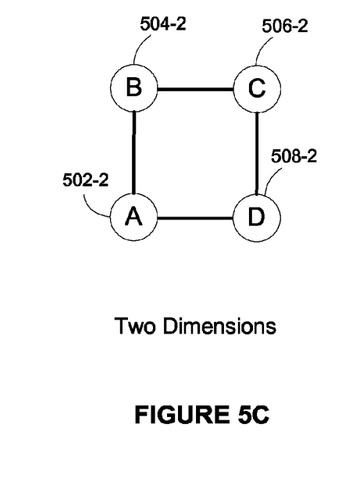

FIG. 5C represents four switches (A 502-2, B 504-2, C 506-2, and D 508-2). Each switch is connected to two other switches. For example, switch A 502-2 is connected to switches B 504-2 and D 508-2, but not C 506-2. A hypercube where each switch is connected to two other switches is a two dimensional hypercube. In some implementations, a two dimensional hyper cube is a mesh where each switch is connected to 4 other nodes (one above, one below, one left, and one right).

Figure 5D:
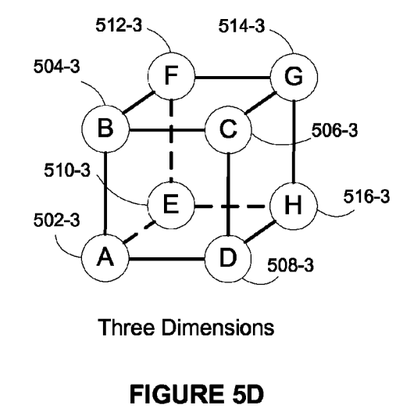

FIG. 5D represents eight switches (A 502-3, B 504-3, C 506-3, D 508-3, E 510-3, F 512-3, G 514-3, and H 516-3). Each switch connects to 3 other switches. A hypercube where each switch is connected to three other switches is a three dimensional hypercube. In some implementations, a three dimensional hyper cube is a three dimension lattice where each switch is connected to 6 other nodes (one above, one below, one left, one right, one in front, and one behind).

FIGS. 6A-6D are block diagrams of hypercube topologies during performance testing by dimension in accordance with some implementations. Note that each circle (e.g. A, B, C, D, etc.) represents a switch (FIG. 1, 102) and associated computer nodes The lines between circles represent direct links between switches (FIG. 1, 102). Each line may represent a single physical link (in a standard hypercube) or more than one physical link (in enhanced hypercubes).

Figure 6A:
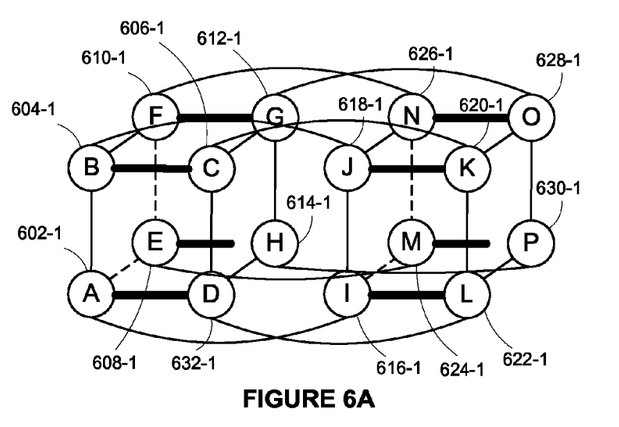
FIGS. 6A-6D are block diagrams of hypercube topologies during performance testing by dimension in accordance with some implementations.

FIG. 6A displays a four dimensional hypercube. A four dimension hypercube is a hypercube wherein each node is connected to 4 other nodes. For example, node A is linked directly to B, D, E, and I. Because each switch is connected to four other switches, a performance test has to run 4 tests to test each link in the hypercube. In some implementations, each dimension is tested separately. FIG. 6A displays the first dimension to be tested. Each switch is paired with another node in accordance with the first dimension. For example, A 602-1 is paired with D 632-1. None of the switches are left out or included in more than one pairing. Performance tests are conducted for all the switch pairs in the first dimension.

Figure 6B:
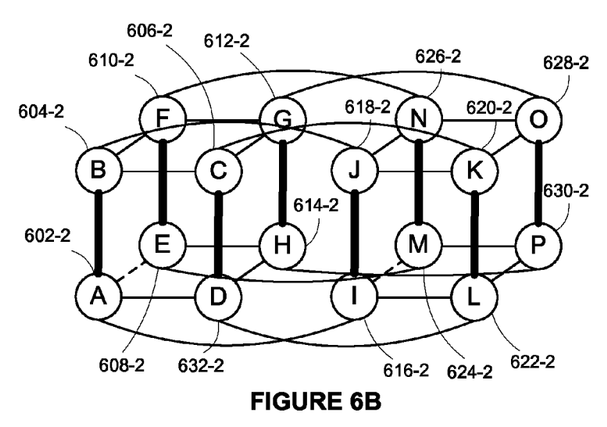

In some implementations, once a first dimension is tested each link and node is evaluated based on performance measures. Components determined to be underperforming are recorded. The hypercube then tests the second dimension. FIG. 6B displays the connections tested in the second test. Each switch is paired with another switch based on the second connection associated with the switch; the second connection is distinct from the first connection, tested in the first performance test. For example, switch A 602-2 is now paired with switch B 604-2.

Figure 6C:
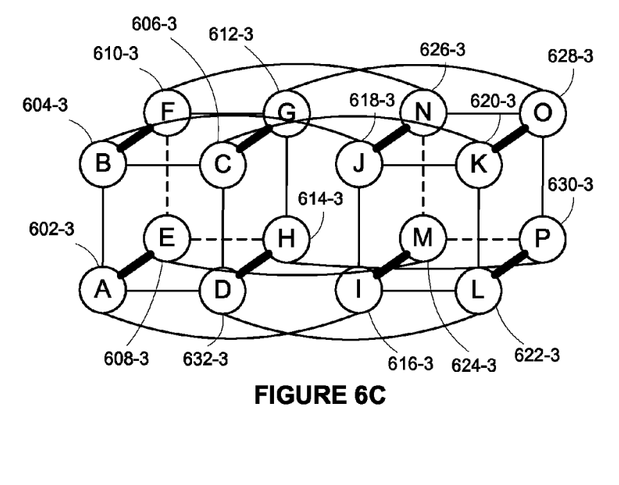

In some implementations, the third dimension and the fourth dimension are then tested. FIG. 6C displays the connections tested in the third test. Each switch is paired with another switch based on the third connection associated with the switch; the third connection is distinct from the first and second connections tested in the first and second performance tests. For example, switch A 602-3 is now paired with switch E 608-3.

Figure 6D:
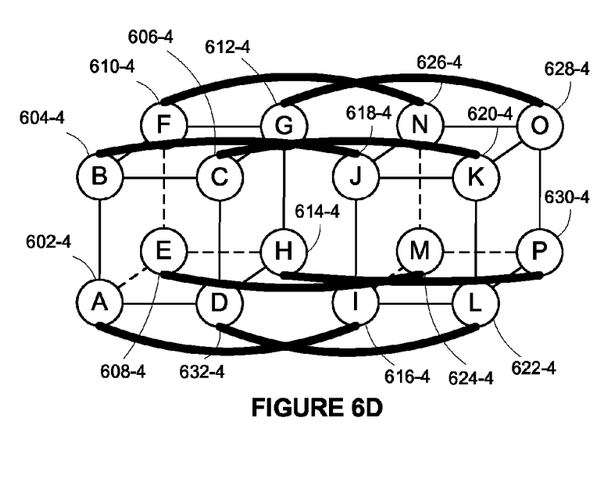

FIG. 6D displays the connections tested in the fourth test. Each switch is paired with another switch based on the fourth connection associated with the switch; the fourth connection is distinct from the first, second, and third connections tested in the first, second, and third performance tests. For example, switch A 602-4 is now paired with switch I 616-4.

Figure 7:
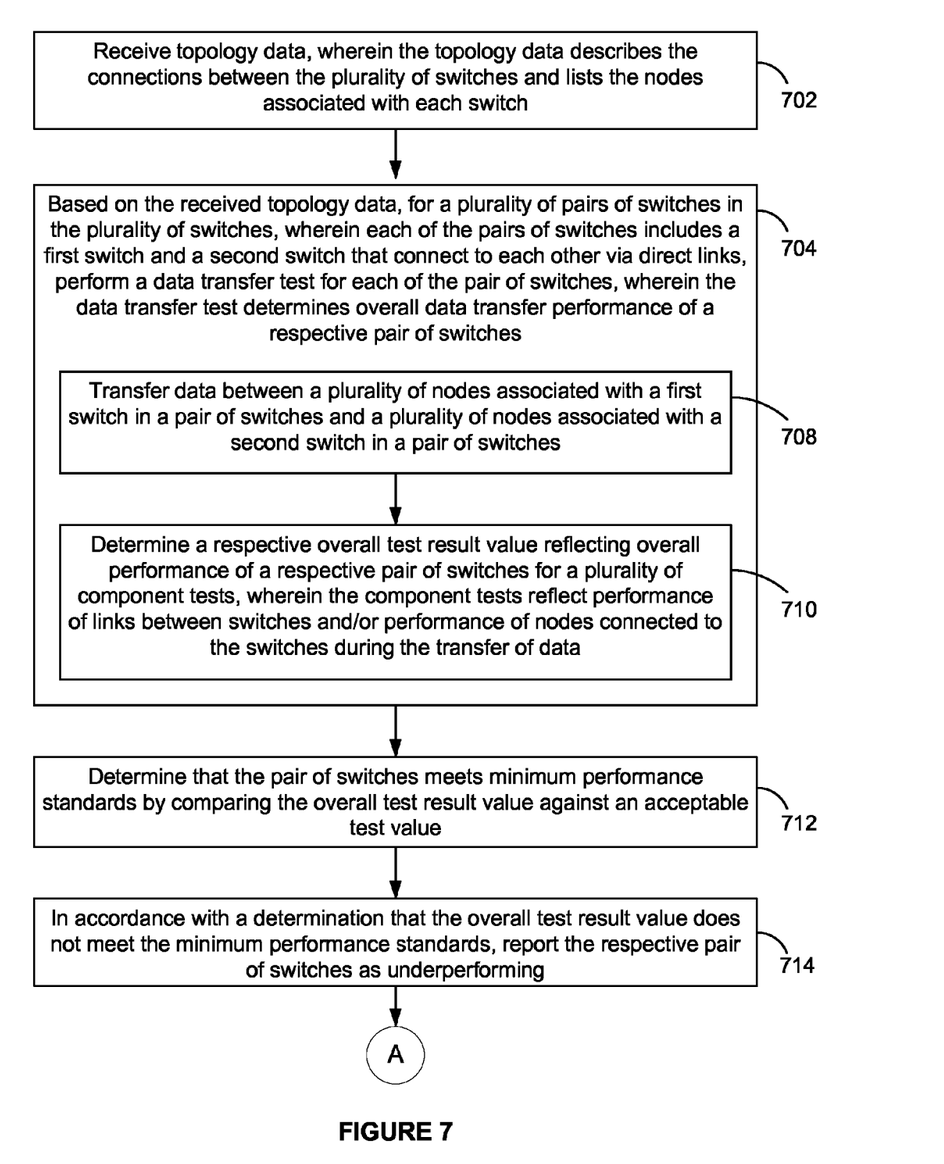
FIG. 7 is a flow diagram illustrating the process for evaluating large scale computer systems based on performance, in accordance with some implementations.

FIG. 7 is a flow diagram illustrating the process of for evaluating large scale computer systems based on performance, in accordance with some implementations. Each of the operations shown in FIG. 7 may correspond to instructions stored in a computer memory or computer readable storage medium. Optional operations are indicated by dashed lines (e.g., boxes with dashed-line borders). In some implementations, the method described in FIG. 7 is performed by the control node (FIG. 1, 104).

In accordance with some implementations, the control node (FIG. 1, 104) receives topology data (702), wherein the topology data lists all the switches (FIG. 1, 102) and nodes (FIG. 1, 108) included in the large scale distributed memory computer system and the connections between the plurality of switches (FIG. 1, 102) and lists the nodes (FIG. 1, 108) associated with each switch (FIG. 1, 102). In some implementations, topological data includes data identifying the number of connections associated with each switch (FIG. 1, 102). In some implementations, the switches are arranged in a hypercube topology and the number of dimensions associated with the hypercube is based on the number of connections per switch.

In some implementations, based on the received topology data, for a plurality of pairs of switches in the plurality of switches, wherein each of the pairs of switches includes a first switch and a second switch that connect to each other via direct links, the control node (FIG. 1, 104) performs a data transfer test for each of the pair of switches, wherein the data transfer test determines overall data transfer performance of a respective pair of switches (704). In some implementations, the data transfer tests for all the switches are performed concurrently. In some implementations, each data transfer test is a bi-directional test between a plurality of nodes associated with a first switch in a pair of switches and all nodes associated with a second switch in a pair of switches. In some implementations, each switch is grouped into a single pair of switches at a given time.

In some implementations, performing a data transfer test includes transferring data between all nodes associated with a first switch in a pair of switches and all nodes associated with a second switch in a pair of switches (708). In some implementations, the control node (FIG. 1, 104) determines a respective overall test result value reflecting overall performance of a respective pair of switches for a plurality of component tests, wherein the component tests reflect performance of links between switches and/or performance of nodes connected to the switches during the transfer of data (710).

In some implementations, the data transfer test includes transferring a predetermined amount of data from a first node connected to the first switch in the respective pair of switches to a second node connected to the second switch in the respective pair of switches. In this case the overall test result value represents the amount of data transferred per unit time. In other implementations, the data transfer test includes transferring data from a first node connected to the first switch in the respective pair of switches to a second node connected to the second switch in the respective pair of switches for a predetermined amount of time.

In some implementations, the control node (FIG. 1, 104) determines that the pair of switches meets minimum performance standards by comparing the overall test result value against an acceptable test value (712). In some implementations, the control node (FIG. 1, 104) in accordance with a determination that the overall test result value does not meet the minimum performance standards, reports the respective pair of switches as underperforming (714). In some implementations, the acceptable performance standard test value is pre-determined. In other implementations, the acceptable performance standard test value is based on a median test result value for all tested switch pairs.

Figure 8:
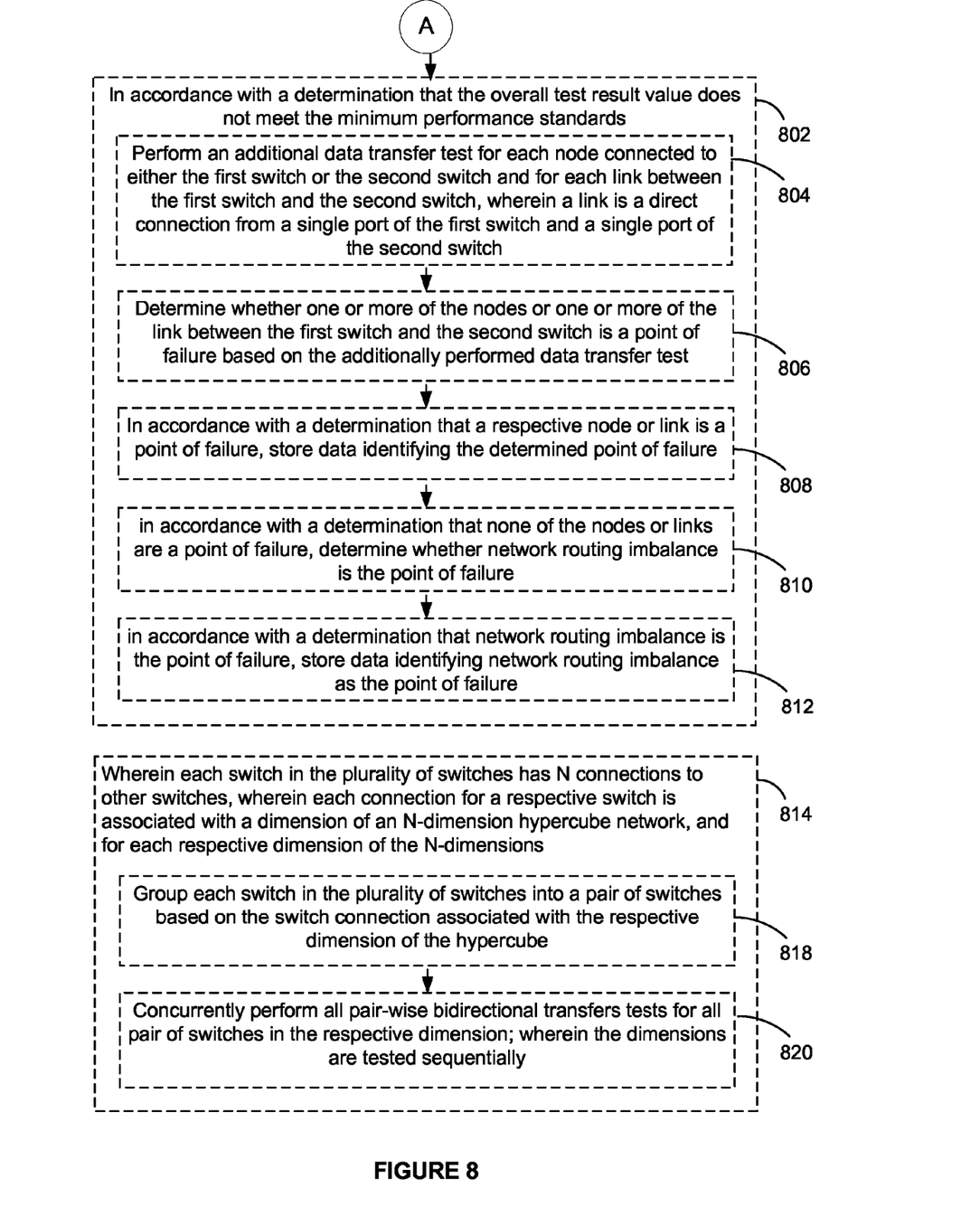
FIG. 8 is a flow diagram illustrating the process for evaluating large scale computer systems based on performance, in accordance with some implementations.

FIG. 8 is a flow diagram illustrating the process for evaluating large scale computer systems based on performance, in accordance with some implementations. Each of the operations shown in FIG. 8 may correspond to instructions stored in a computer memory or computer readable storage medium. Optional operations are indicated by dashed lines (e.g., boxes with dashed-line borders). In some implementations, the method described in FIG. 8 is performed by the control node (FIG. 1, 104).

In accordance with some implementations, in accordance with a determination that the overall test result value does not meet the minimum performance standards (802): the control module (FIG. 1, 106) performs an additional data transfer test for each node connected to either the first switch or the second switch and for each link between the first switch and the second switch, wherein a link is a direct connection from a single port of the first switch and a single port of the second switch (804). In some implementations, the control node (FIG. 1, 104) determines whether one or more of the nodes or one or more of the links between the first switch and the second switch is a point of failure based on the additionally performed data transfer test (806).

In some implementations, in accordance with a determination that a respective node or link is a point of failure, the control node (FIG. 1, 104) stores data identifying the determined point of failure (808). In accordance with a determination that none of the nodes or links is a point of failure, the control node (FIG. 1, 104) determines whether network routing imbalance is the point of failure (810). In some implementations, when the bidirectional node pair data transfers tests are done, the link associated with each transfer is noted. In a statically routed configuration with M nodes per switch and N switch-to-switch links, there should never be more than ceiling (M/N) node pairs that use any given link. For example, with M=9 nodes per switch and N=4 direct links between switches, a maximum utilization of would be ceiling(9/4)=3 node pairs for any link. In this example, if a link is being used by 4 or more node pairs, then the control node (FIG. 1, 104) determines that routing imbalance the cause of the underperformance. In some implementations, in accordance with a determination that network routing imbalance is the point of failure, the control node (FIG. 104) stores data identifying network routing imbalance as the point of failure (812).

In some implementations, the large scale distributed memory computer system has a plurality of switches arranged in a hypercube topology. Each switch in the plurality of switches has N connections to other switches, wherein each connection for a respective switch is associated with a dimension of an N-dimensional hypercube network (814). For each respective dimension of the N-dimensions, the control node (FIG. 1, 104) groups each switch in the plurality of switches into a pair of switches based on the switch connection associated with the respective dimension of the hypercube (818). In some implementations, the control node (FIG. 1, 104) concurrently performs all pair-wise bidirectional transfers tests for all pair of switches in the respective dimension; wherein the dimensions are tested sequentially (820)

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present implementations. The first contact and the second contact are both contacts, but they are not the same contact.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed is:

1. A method for evaluating the performance of large scale computer systems, the method comprising:
   receiving topology data at a large scale distributed memory computer system, wherein the topology data describes the connections between a plurality of switches, each switch connected to a plurality of nodes, and the topology data lists each node of the plurality of nodes that is associated with each switch of the plurality of switches;
   performing a data transfer test for each of a pair of switches based on the received topology data for each pair of switches in the plurality of switches, wherein each of the pair of switches includes a first switch and a second switch that connect to each other via direct links, the first and the second switch grouped as a pair when preparing to perform the data transfer test, and each switch is included in only one of the pair of switches at a time;
   transferring data between a plurality of nodes associated with a first switch in a pair of switches and a plurality of nodes associated with a second switch in the pair of switches;
   determining a respective overall test result value reflecting overall performance of a respective pair of switches for a plurality of component tests, wherein the component tests reflect performance of links between switches and performance nodes connected to the switches during the transfer of data;
   determining that the pair of switches meets minimum performance standards by comparing the overall test result value against an acceptable test value; and
   reporting the respective pair of switches as underperforming in accordance with a determination that the overall test result value does not meet the minimum performance standards.

2. The method of claim 1, further comprising:
   performing an additional data transfer test for each node connected to either the first switch or the second switch and for each link between the first switch and the second switch, wherein a link is a direct connection from a single port of the first switch and a single port of the second switch;

determining whether one or more of the nodes or one or more of the link between the first switch and the second switch is a point of failure based on the additionally performed data transfer test; and storing data identifying the determined point of failure in accordance with a determination that a respective node or link is a point of failure.

3. The method of claim 2, further comprising:

determining that network routing imbalance is the point of failure in accordance with a determination that none of the nodes or links are a point of failure; and storing data identifying network routing imbalance as the point of failure in accordance with a determination that network routing imbalance is the point of failure.

4. The method of claim 1, wherein data transfer tests for each pair of switches are performed concurrently.

5. The method of claim 1, wherein the data transfer test is a bi-directional test between a plurality of nodes associated with a first switch in a pair of switches and all nodes associated with a second switch in a pair of switches.

6. The method of claim 1, wherein the data transfer test includes transferring a predetermined amount of data from a first node connected to the first switch in the respective pair of switches to a second node connected to the second switch in the respective pair of switches.

7. The method of claim 6 wherein the overall test result value represents the amount of data transferred per unit time.

8. The method of claim 1, wherein the data transfer test includes transferring data from a first node connected to the first switch in the respective pair of switches to a second node connected to the second switch in the respective pair of switches for a predetermined amount of time.

9. The method of claim 1, wherein an acceptable performance standard test value is predetermined.

10. The method of claim 1, wherein the acceptable performance standard test value is based on a median test result value for the respective pair of switches.

11. The method of claim 1, wherein each switch in the plurality of switches has N connections to other switches and each connection for a respective switch is associated with a dimension of an N-dimension hypercube network.

12. The method of claim 11, further comprising:

grouping each switch in the plurality of switches into a pair of switches based on the switch connection associated with the respective dimension of the hypercube for each respective dimension of the N-dimensions; and concurrently performing all pair-wise bidirectional transfers tests for all pair of switches in the respective dimension, wherein the dimensions are tested sequentially.

13. A non-transitory computer readable storage medium having embodied thereon a program executable by a processor to perform a method for evaluating the performance of large scale computer systems, the method comprising:

receiving topology data at a large scale distributed memory computer system, wherein the topology data describes the connections between a plurality of switches, each switch connected to a plurality of nodes, and the topology data lists each node of the plurality of nodes that is associated with each switch of the plurality of switches;

performing a data transfer test for each of a pair of switches based on the received topology data for each pair of switches in the plurality of switches, wherein each of the pair of switches includes a first switch and a second switch that connect to each other via direct links, the first and the second switch grouped as a pair when preparing to perform the data transfer test, and each switch is included in only one of the pair of switches at a time;

transferring data between a plurality of nodes associated with a first switch in a pair of switches and a plurality of nodes associated with a second switch in the pair of switches;

determining a respective overall test result value reflecting overall performance of a respective pair of switches for a plurality of component tests, wherein the component tests reflect performance of links between switches and performance nodes connected to the switches during the transfer of data;

determining that the pair of switches meets minimum performance standards by comparing the overall test result value against an acceptable test value; and reporting the respective pair of switches as underperforming in accordance with a determination that the overall test result value does not meet the minimum performance standards.

* * * * *